(12) United States Patent
Umeno et al.

(10) Patent No.: US 10,759,250 B2
(45) Date of Patent: Sep. 1, 2020

(54) VEHICLE STABILIZER DEVICE

(71) Applicant: NHK SPRING CO., LTD., Yokohama-shi, Kanagawa (JP)

(72) Inventors: Jun Umeno, Yokohama (JP); Yukihiro Seki, Yokohama (JP); Toru Itihara, Yokohama (JP); Hiroshi Mizukami, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 15/994,359

(22) Filed: May 31, 2018

(65) Prior Publication Data

US 2018/0272828 A1    Sep. 27, 2018

Related U.S. Application Data

(63) Continuation of application No. PCT/JP2016/085235, filed on Nov. 28, 2016.

(30) Foreign Application Priority Data

Dec. 2, 2015  (JP) .................................. 2015-235814

(51) Int. Cl.
 *B60G 21/055* (2006.01)
 *F16F 1/373* (2006.01)

(52) U.S. Cl.
 CPC ....... *B60G 21/055* (2013.01); *B60G 21/0551* (2013.01); *F16F 1/3735* (2013.01);
 (Continued)

(58) Field of Classification Search
 CPC .............. B60G 21/055; B60G 21/0551; B60G 2202/135; B60G 2204/41;
 (Continued)

(56) References Cited

U.S. PATENT DOCUMENTS 3,448,994 A * 6/1969 King .................... B60G 21/055
                                                   280/124.106
4,491,342 A * 1/1985 Aubry .................... B60G 3/145
                                                   267/154

(Continued)

FOREIGN PATENT DOCUMENTS

JP       01175906 U      12/1989
JP       03-086747 A      4/1991
(Continued)

OTHER PUBLICATIONS

International Search Report (ISR) and Written Opinion dated Jan. 31, 2017 issued in International Application No. PCT/JP2016/085235.

(Continued)

*Primary Examiner* — Timothy Wilhelm
(74) *Attorney, Agent, or Firm* — Holtz, Holtz & Volek PC

(57) ABSTRACT

A stabilizer device includes a stabilizer extending in a width direction of a vehicle, and a bush unit. The bush unit includes a bracket formed of metal, and a rubber bush. The rubber bush is formed of a plurality of bush pieces, and is fixed to the stabilizer by an adhesion layer. The adhesion layer is constituted of an adhesion member including an adhesive applied to inner surfaces of the bush pieces. A bonding display portion formed of a part of the adhesion member is provided at a corner on an end face of the bush piece.

13 Claims, 5 Drawing Sheets

(52) U.S. Cl.
CPC .................. *B60G 2202/135* (2013.01); *B60G 2204/1222* (2013.01); *B60G 2204/41* (2013.01); *B60G 2206/427* (2013.01); *B60G 2206/821* (2013.01); *F16F 2226/042* (2013.01); *F16F 2230/0005* (2013.01); *F16F 2230/0047* (2013.01)

(58) Field of Classification Search
CPC ............ B60G 2204/1222; F16F 1/3735; F16F 2230/0047; F16F 2230/0005; F16F 2226/042
See application file for complete search history.

(56) References Cited

U.S. PATENT DOCUMENTS

| | | | | |
|---|---|---|---|---|
| 4,883,289 | A * | 11/1989 | Sardou | B29C 70/205 280/684 |
| 7,380,775 | B2 * | 6/2008 | Niwa | B60G 21/0551 267/293 |
| 7,448,636 | B2 * | 11/2008 | Johnson | B60G 3/20 280/124.152 |
| 8,360,450 | B2 * | 1/2013 | Kuroda | B60G 21/0551 280/124.106 |
| 8,424,891 | B2 * | 4/2013 | Nagai | F16F 1/16 280/124.107 |
| 8,505,940 | B1 | 8/2013 | Hufnagle et al. | |
| 9,546,705 | B2 * | 1/2017 | Ishimatsu | F16F 1/3835 |
| 9,981,524 | B2 * | 5/2018 | Matsumura | B60G 21/0551 |
| 9,995,358 | B2 * | 6/2018 | Powell | F16F 1/38 |
| 10,232,678 | B2 | 3/2019 | Kuroda et al. | |
| 2006/0091595 | A1 * | 5/2006 | Hayashi | B60G 21/0551 267/276 |
| 2008/0106056 | A1 * | 5/2008 | Kleckner | B60G 21/0551 280/124.107 |
| 2008/0277847 | A1 * | 11/2008 | Missig | F16C 27/063 267/141.3 |
| 2012/0024463 | A1 | 2/2012 | Grundmeier | |
| 2012/0068429 | A1 * | 3/2012 | Hartel | B60G 21/0551 280/124.106 |
| 2012/0211958 | A1 * | 8/2012 | Lam | B60G 21/0551 280/124.106 |
| 2017/0043641 | A1 * | 2/2017 | Kuroda | B60G 21/055 |
| 2018/0134110 | A1 * | 5/2018 | Saihara | B29C 65/48 |

FOREIGN PATENT DOCUMENTS

| | | | |
|---|---|---|---|
| JP | 04004388 | A | 1/1992 |
| JP | 10-110148 | A | 4/1998 |
| JP | 10306832 | A | 11/1998 |
| JP | 11352432 | A | 12/1999 |
| JP | 2001227463 | A | 8/2001 |
| JP | 2002264625 | A | 9/2002 |
| JP | 2005319850 | A * | 11/2005 |
| JP | 2005319850 | A | 11/2005 |
| JP | 2006069233 | A | 3/2006 |
| JP | 2006123818 | A | 5/2006 |
| JP | 2007176274 | A | 7/2007 |
| JP | 2010202032 | A | 9/2010 |
| JP | 2012105768 | A | 6/2012 |
| JP | 2012105768 | A * | 6/2012 |
| WO | 2015163173 | A1 | 10/2015 |

OTHER PUBLICATIONS

Japanese Office Action (and English language translation thereof) dated Jan. 8, 2019 issued in counterpart Japanese Application No. 2015-235814.
Japanese Office Action dated Jul. 9, 2019 (and English translation thereof) issued in Japanese Patent Application No. 2015-235814.
Extended European Search Report (EESR) dated Jul. 3, 2019 issued in European Application No. 16870621.6.

* cited by examiner

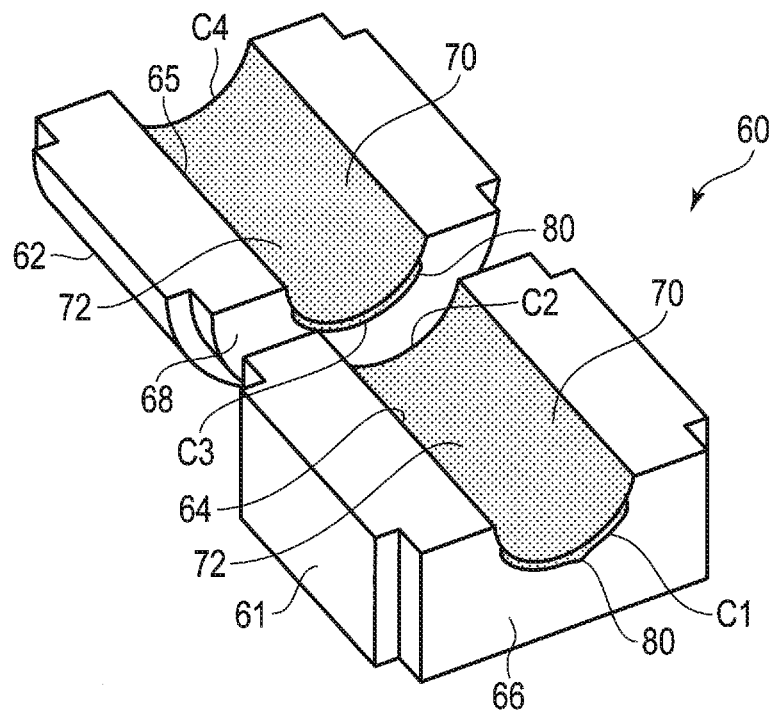
F I G. 6
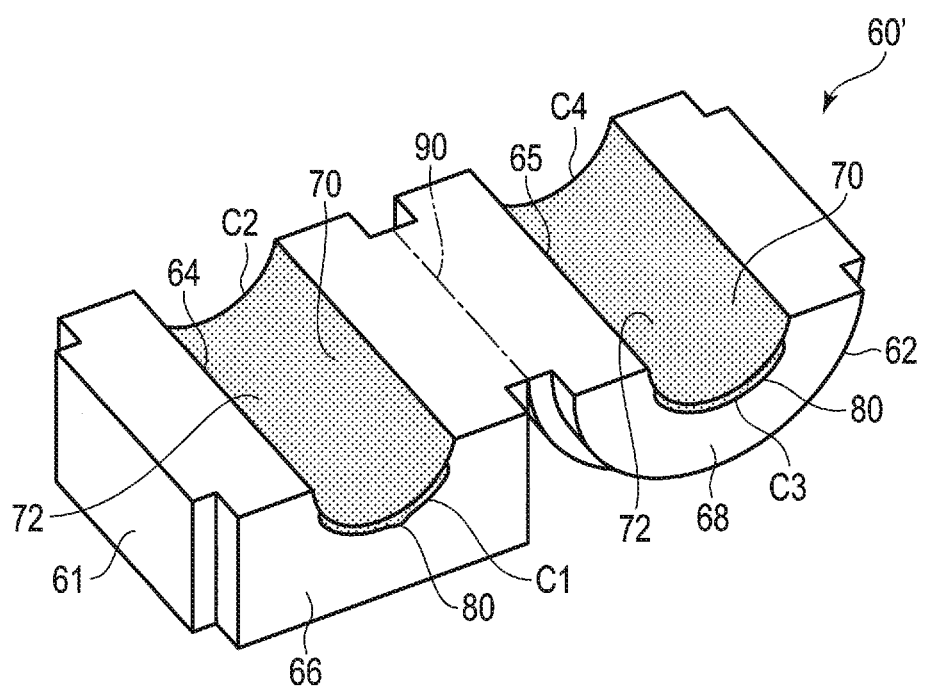
F I G. 7

VEHICLE STABILIZER DEVICE

CROSS-REFERENCE TO RELATED APPLICATIONS

This application is a Continuation Application of PCT Application No. PCT/JP2016/085235, filed Nov. 28, 2016 and based upon and claiming the benefit of priority from prior Japanese Patent Application No. 2015-235814, filed Dec. 2, 2015, the entire contents of all of which are incorporated herein by reference.

BACKGROUND OF THE INVENTION

1. Field of the Invention

The present invention relates to a vehicle stabilizer device comprising a rubber bush arranged in a suspension mechanism part of a vehicle such as a car.

2. Description of the Related Art

A stabilizer device arranged in a suspension mechanism part of a vehicle includes a stabilizer formed of a steel pipe or a solid rod-shaped steel material, as described in, for example, Patent Literature 1 (JP H01-175906 U) or Patent Literature 2 (JP 2002-264625 A). The stabilizer is supported on a vehicle body via a support portion. The stabilizer includes a torsion portion extending in a width direction of the vehicle, a pair of arm portions which are continuous with both ends of the torsion portion via bent portions, and eye portions formed at distal ends of the respective arm portions.

An example of the support portion is a pair of bush units comprising rubber bushes. The torsion portion of the stabilizer is supported on the vehicle body via the bush unit. The eye portion is connected to a suspension arm, etc., via a connecting member such as a stabilizer link. With respect to the stabilizer device mounted in the vehicle, as the arm portions, the bent portions, and the torsion portion function as a spring in reaction to a rolling behavior of the vehicle body, roll stiffness of the vehicle can be enhanced.

The form of the stabilizer device is various according to the suspension mechanism part of the vehicle. For example, a type (bush-bonding-type) in which the rubber bush is bonded to the stabilizer, and a type (bush-unbonded-type) in which the rubber bush is not bonded to the stabilizer are known. In the bush-bonding-type, the rubber bush is also twisted and deformed when the stabilizer is twisted. Since a frictional surface does not exist between the stabilizer and the rubber bush in the bush-bonding-type stabilizer device, there is no fear of causing abnormal sound. In contrast, in the bush-unbonded-type stabilizer device, a contact surface between the stabilizer and the rubber bush slides when the stabilizer is twisted.

In the case of manufacturing the bush-bonding-type stabilizer device in large quantities, as in a stabilizer 1 shown in FIG. 8, for example, an adhesive 3 is applied by spraying, etc., for a length L1 on a surface of a torsion portion 2, at the convenience of a production line, for example. After that, a rubber bush 4 is placed on the adhesive 3. In this state, by heating the stabilizer 1 together with pressurizing the rubber bush 4 from both sides, the adhesive 3 is cured for a predetermined time. In this way, the adhesive 3 is cured, and the rubber bush 4 is fixed to the stabilizer 1.

In a conventional stabilizer 1 shown in FIG. 8, the adhesive 3 is applied to a relatively large area on the surface of the torsion portion 2. Moreover, parts 3a and 3b of the adhesive 3 is exposed on the surface of the stabilizer 1 on the outer side of the rubber bush 4. Accordingly, even after the rubber bush 4 has been placed over the stabilizer 1, whether or not the adhesive 3 is applied can be visually checked from outside. However, since the parts 3a and 3b of the adhesive 3 stick on a wide range of the surface of the stabilizer 1, the outer appearance of the stabilizer 1 may be deteriorated. Moreover, a problem that the adhesive 3 is used largely arises. Further, a portion where the adhesive is applied has conventionally been heated by high-frequency induction heating, etc., from outside the rubber bush 4 in a state where the rubber bush 4 is placed over the stabilizer 1. Accordingly, not only does the heating take time, but there also arises a problem that the temperature control of the portion where the adhesive is applied is difficult.

Hence, one idea was to apply the adhesive on an inner surface of the rubber bush (the surface in contact with the stabilizer). However, in such a case, after placing the rubber bush over the stabilizer, the adhesive is hidden inside the rubber bush. Accordingly, whether or not the adhesive is applied, (presence of an adhesion layer) could not be visually checked. Consequently, it is possible that a defective product not having an adhesive applied to a rubber bush by mistake even though it should have been used for a bush-bonding-type stabilizer will be overlooked. Conversely, it is possible that a defective product having an adhesive applied to a rubber bush by mistake even though it should have been used for a bush-unbonded-type stabilizer will be overlooked.

BRIEF SUMMARY OF THE INVENTION

Accordingly, an object of the present invention is to provide a vehicle stabilizer device for which the presence or absence of an adhesion layer can be checked even after a rubber bush has been placed over a stabilizer, in which an area for applying an adhesion member is small, and for which an increase in the amount of use of the adhesion member can be suppressed.

One embodiment relates to a vehicle stabilizer device including a stabilizer extending in a width direction of a vehicle, and a bush unit provided on a support portion of the stabilizer, in which the bush unit includes a bracket formed of metal, a rubber bush, an adhesion layer formed of an adhesion member, and a bonding display portion formed of a part of the adhesion member. The rubber bush is formed of a plurality of bush pieces arranged inside the bracket. Further, the rubber bush includes a hole through which the stabilizer passes. The adhesion layer is provided between an inner surface of the hole of the rubber bush and the stabilizer. The adhesion member includes an adhesive formed on the inner surface of the hole. The bonding display portion is provided at a corner on an end face of the bush piece near the inner surface, sticks to the end face, and can be visually checked from outside the rubber bush.

According to the embodiment, even after the rubber bush has been mounted on the stabilizer, by visually checking the presence or absence of the bonding display portion, it is possible to check whether the adhesion layer is provided between the rubber bush and the stabilizer. Thus, a defect that the adhesion layer is not provided by mistake in the case of a bush-bonding-type device can be found.

An example of the bonding display portion is formed of at least one of the adhesive and a primer layer. Further, the bonding display portion may be formed at a part of the hole in a circumferential direction thereof at the corner. Alternatively, the bonding display portion may be formed on the entire periphery of the hole at the corner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a perspective view of a first bush piece and a second bush piece of the rubber bush shown in FIG. 5 arranged side by side.

FIG. 7 is a perspective view of a rubber bush according to a second embodiment.

DETAILED DESCRIPTION OF THE INVENTION

A vehicle stabilizer device 10 according to a first embodiment will be described with reference to FIGS. 1 to 6.

Figure 1:
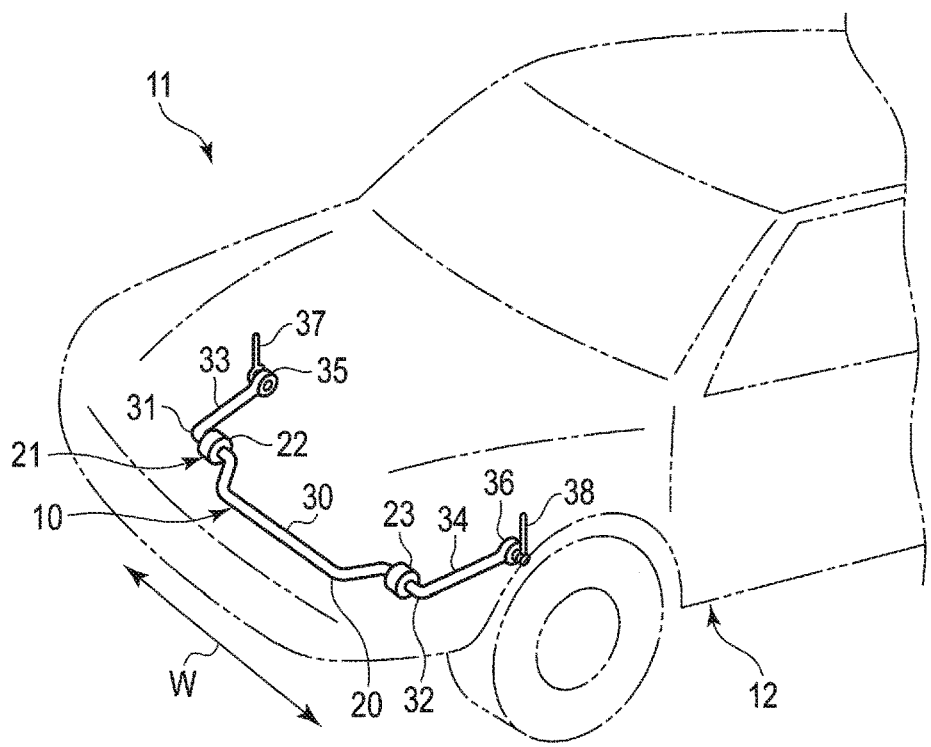
FIG. 1 is a perspective view schematically showing a part of a vehicle and a stabilizer device.

FIG. 1 shows a part of a vehicle 11 comprising the stabilizer device 10. The stabilizer device 10 is arranged in a suspension mechanism part of the vehicle 11. The stabilizer device 10 includes a stabilizer 20, and a support portion 21. The stabilizer 20 is formed of a rod-shaped spring steel (steel material) extending in a width direction (i.e., a direction indicated by arrow W) of a vehicle body 12. The support portion 21 supports the stabilizer 20 on the vehicle body 12. An example of the support portion 21 comprises a pair of bush units 22 and 23.

The stabilizer 20 includes a torsion portion 30, bent portions 31 and 32, and arm portions 33 and 34. The torsion portion 30 extends in the width direction (i.e., the direction indicated by arrow W) of the vehicle body 12. The arm portions 33 and 34 are continuous with both ends of the torsion portion 30 through their corresponding bent portions 31 and 32. On distal ends of the arm portions 33 and 34, eye portions 35 and 36 are formed, respectively. The eye portions 35 and 36 are connected to suspension arms of the suspension mechanism part, for example, through connecting members 37 and 38 such as stabilizer links.

The stabilizer 20 of the present embodiment is hollow. A material of the stabilizer 20 which is hollow is a steel pipe. By bending the steel pipe by a bending machine, the steel pipe is formed into a predetermined shape. As the other embodiment, a solid stabilizer may be adopted. A material of the solid stabilizer is a steel rod. The shape of the stabilizer 20 is not limited to planar. For example, the stabilizer 20 may include one or more bending portions in the torsion portion 30, or one or more bending portions in the arm portions 33 and 34, including a three-dimensional bent configuration. Also, the bent portions 31 and 32 may be configured to have a three-dimensional bent configuration, for example, and can be formed into various bent shapes according to the specifications of the suspension mechanism part.

On a surface of the stabilizer 20, a resin-based coating film 40 (FIGS. 3 and 4) is provided. The coating film 40 is formed of, for example, epoxy resin, to serve the purpose of preventing rust, mainly, and in consideration of the appearance quality as well. A compressive residual stress is applied to a surface layer portion including the surface of the stabilizer 20 by shot peening.

As shown in FIG. 1, the torsion portion 30 of the stabilizer 20 is supported on a part of the vehicle body 12 (such as a cross-member), for example, via the bush units 22 and 23. Forces having opposite phases are input to the arm portions 33 and 34, such as when the vehicle 11 drives on a curve. At this time, a bending force is exerted on the arm portions 33 and 34, and bending and torsional force is exerted on the bent portions 31 and 32. Further, as a repulsive load is produced by the torsion portion 30 being twisted, for example, a rolling behavior of the vehicle body 12 is suppressed.

Figure 2:
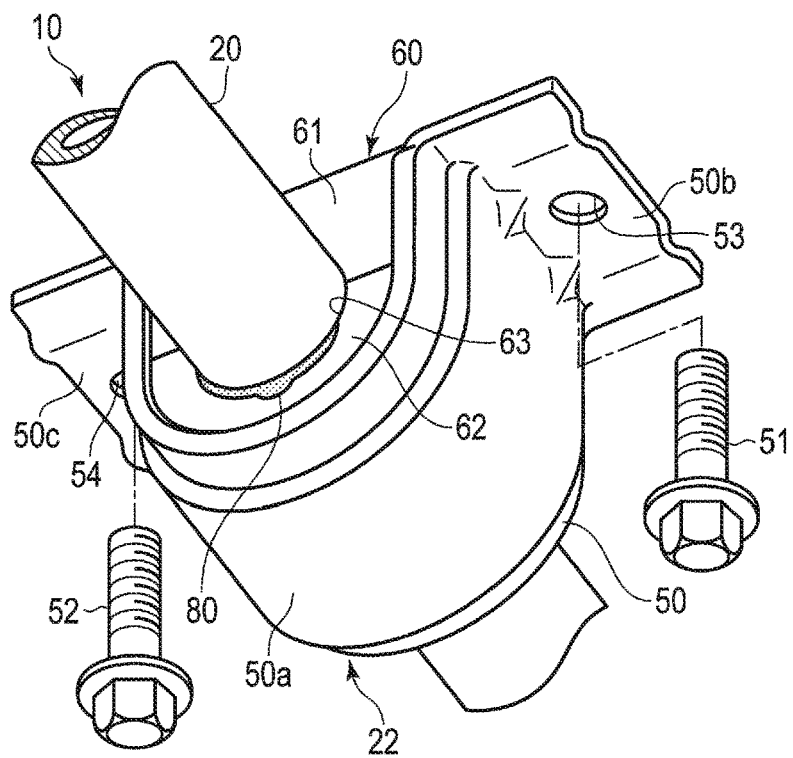
FIG. 2 is a perspective view of a part of a stabilizer device according to a first embodiment.
Figure 3:
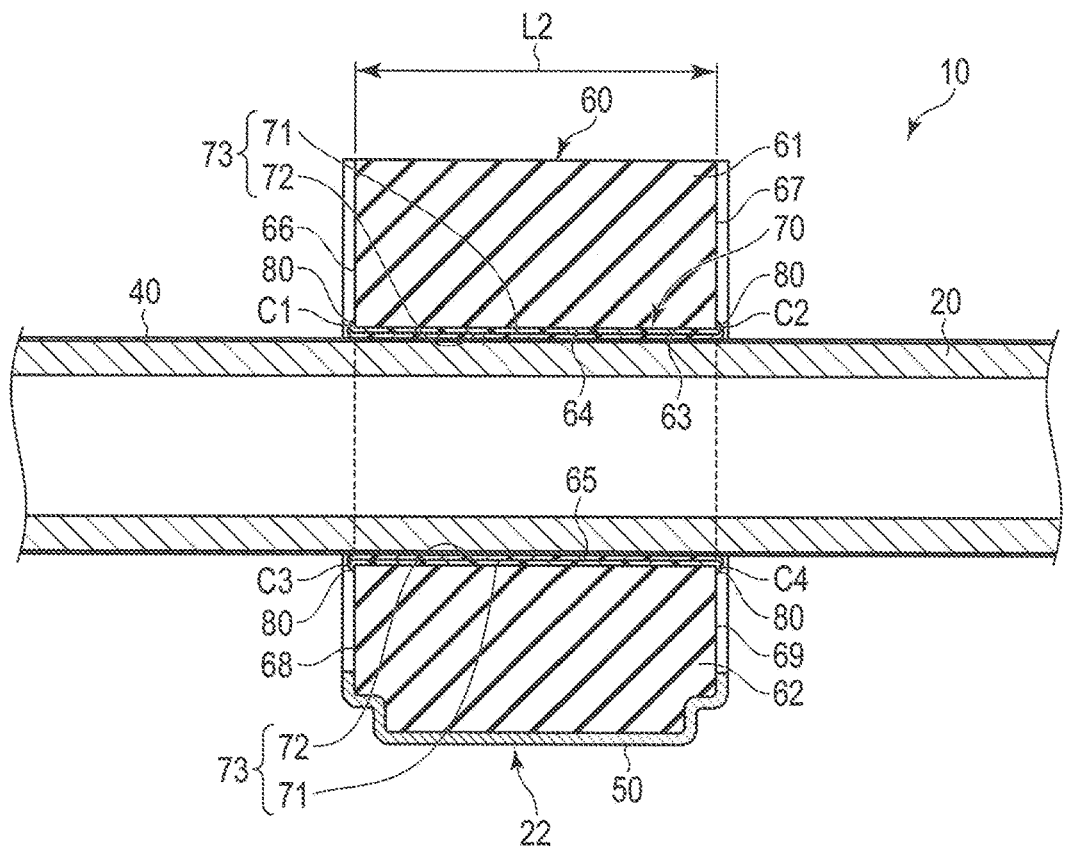
FIG. 3 is a cross-sectional view of a part of the stabilizer device shown in FIG. 2 in an axial direction thereof.
Figure 4:
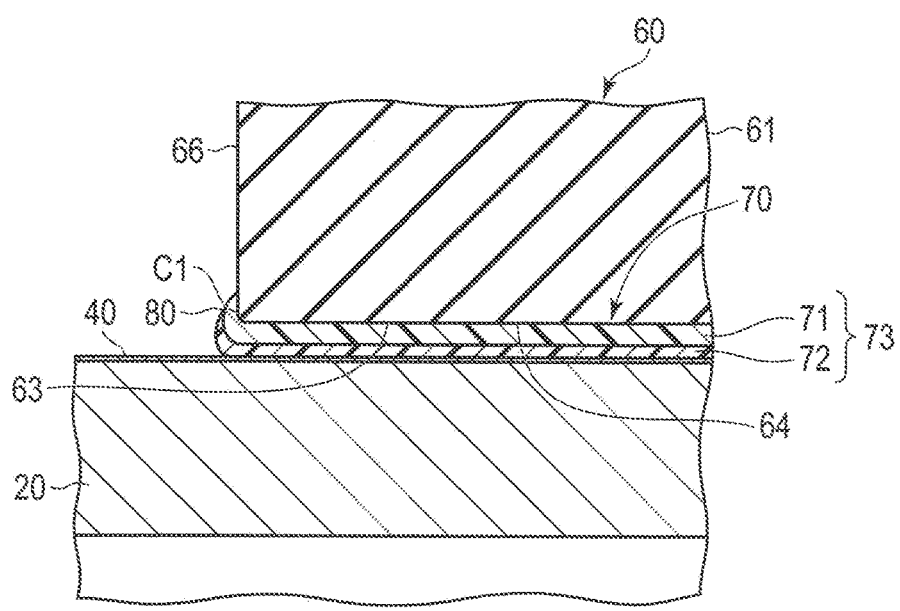
FIG. 4 is a cross-sectional view showing a part of the stabilizer device in an enlarged scale.

Since the pair of bush units 22 and 23 has a common structure, one bush unit 22 will be hereinafter described as a typical example of the bush unit. FIGS. 2 to 4 show the bush unit 22. The bush unit 22 comprises a metal bracket 50, and a rubber bush 60 disposed inside the bracket 50. The stabilizer device 10 of the present embodiment is of a bush-bonding-type in which the rubber bush 60 is bonded to the stabilizer 20.

The bracket 50 includes a cover portion 50a, and a pair of arm portions 50b and 50c. The cover portion 50a is shaped such that it encompasses the rubber bush 60 (i.e., substantially U-shaped). The arm portions 50b and 50c are formed on both sides of the cover portion 50a. In the arm portions 50b and 50c, holes 53 and 54 for inserting bolts 51 and 52 therein are formed, respectively. The bush unit 22 is mounted on the suspension mechanism part from the lower side or upper side of the vehicle by the bolts 51 and 52.

Figure 5:
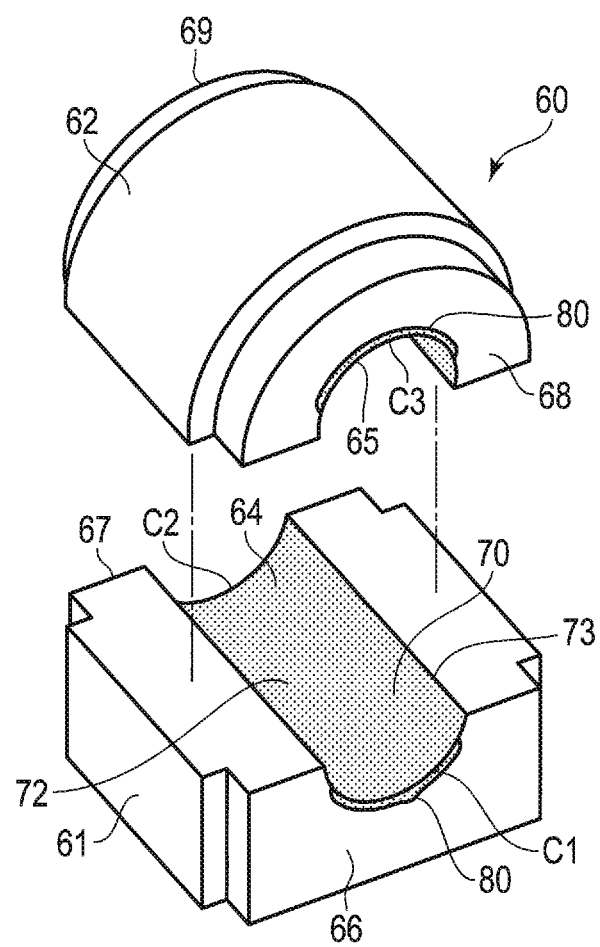
FIG. 5 is an exploded perspective view of a rubber bush of the stabilizer device.

There are various types of rubber bush 60 in terms of the way it is divided (the number of divided parts and the shape, etc.) according to need. Accordingly, while the rubber bush 60 is not limited to the present embodiment, an example of the rubber bush 60 shown in FIG. 5 is in the shape of two divided parts. In other words, the rubber bush 60 is comprised of a pair of two divided parts, i.e., a first bush piece 61 and a second bush piece 62. Each of the first bush piece 61 and the second bush piece 62 is formed of a material having rubber elasticity. An example of the material is formed of kneaded rubber of NR and IIR. The kneaded rubber intended here refers to a blended rubber formed of natural rubber and synthetic rubber such as butyl rubber. In the rubber bush 60, a hole 63 through which the stabilizer 20 passes is formed.

As shown in FIG. 2, the stabilizer 20 is arranged between the first bush piece 61 and the second bush piece 62. In a state in which the bush pieces 61 and 62 are butt against each other, the bush pieces 61 and 62 are fixed to the stabilizer 20 via an adhesion layer 70 (FIGS. 3 and 4). The first bush piece 61 and the second bush piece 62 are covered by the cover portion 50a of the bracket 50 which serves as a housing.

As shown in FIGS. 5 and 6, on the opposed surfaces of the first bush piece 61 and the second bush piece 62, recesses including inner surfaces 64 and 65 are formed, respectively. A radius of curvature of each of the inner surfaces 64 and 65 is slightly smaller than the outer diameter of the torsion portion 30. In a state in which the first bush piece 61 and the second bush piece 62 are matched, as the inner surfaces 64 and 65 are continuous with each other in a circumferential direction, the hole 63 of the rubber bush 60 is formed.

As schematically illustrated in FIGS. 3 and 4, the adhesion layer 70 is provided on each of the inner surfaces 64 and 65 of the bush pieces 61 and 62. The adhesion layer 70 is comprised of an adhesion member 73 including an adhesive 71 and a primer layer 72. The adhesive 71 is applied to the inner surfaces 64 and 65 of the bush pieces 61 and 62. The primer layer 72 is applied on the adhesive 71. The thickness of the adhesion layer 70 (the total thickness of the adhesive 71 and the primer layer 72) is 20 to 100 μm. For example, the thickness of the adhesive 71 is 10 to 70 μm, and the thickness of the primer layer 72 is 10 to 30 μm. If the thickness of the adhesion layer 70 is less than that of the above range, adhesion failure is likely to occur. Conversely, if the thickness of the adhesion layer 70 is greater than that of the above range, process time needed for adhesion becomes longer, and a waste on the material of the adhesion layer 70 is incurred.

The adhesive 71 comprises a polyolefin resin and a solvent, and as the adhesive is heated to a temperature of 140 to 170° C., for example, the solvent is vaporized and the adhesive is cured. The primer layer 72 is used for increasing the adhesion to the coating film 40. The primer layer 72 is formed of a material (for example, a phenolic resin) having better adhesiveness to the coating film 40 than the adhesive 71.

As shown in FIGS. 2, 5, and 6, at part of end faces 66 and 67 of the first bush piece 61 (corners C1 and C2 near the inner surface 64), a bonding display portion 80 is provided. Also at part of end faces 68 and 69 of the second bush piece 62 (corners C3 and C4 near the inner surface 65), the bonding display portion 80 is formed. These bonding display portions 80 may be provided at all of the corners C1 to C4 on the end faces 66 to 69. Alternatively, the bonding display portion 80 may be provided on only the selected end face of the end faces 66 to 69.

The bonding display portion 80 is formed of a part of the adhesion member 73 (an end portion of the adhesion layer 70). That is, the bonding display portion 80 is formed of at least one of the adhesive 71 and the primer layer 72. For example, the bonding display portion 80 shown in FIG. 4 is formed of a part of the adhesive 71 and a part of the primer layer 72. The bonding display portion 80 may be formed at a part of the hole 63 in a circumferential direction thereof, or on the entire circumference of the hole 63.

The bonding display portion 80 is formed in at least a part of the corners C1, C2, C3, and C4 on the end faces 66, 67, 68, and 69. When the adhesive 71 and the primer layer 72 are applied to the inner surfaces 64 and 65 of the bush pieces 61 and 62, parts of the adhesive 71 and the primer layer 72 are made to protrude on at least one place of the end faces 66, 67, 68, and 69, and cured. Consequently, the bonding display portion 80 sticks to at least a part of the end faces 66, 67, 68, and 69. In this embodiment, the bonding display portion 80 is provided on at least one place of the end faces of the rubber bush 60. Accordingly, even after the rubber bush 60 has been placed over the stabilizer 20, the bonding display portion 80 can be visually checked from outside the rubber bush 60.

In the following, steps of fixing one bush unit 22 to the stabilizer 20 will be explained. The other bush unit 23 is also fixed to the stabilizer 20 by the steps similar to those of the bush unit 22.

As shown in FIG. 6, the first bush piece 61 and the second bush piece 62 are arranged in such a state that the inner surfaces 64 and 65 face upward. Further, the adhesion layer 70 is provided on each of the inner surfaces 64 and 65. More specifically, the adhesive 71 in liquid form is applied to the inner surfaces 64 and 65. When the applied adhesive 71 is cured to some degree, the primer layer 72 in liquid form is applied on the adhesive 71. When the adhesive 71 and the primer layer 72 are applied, at least one of the adhesive 71 and the primer layer 72 is stuck at the corners C1 and C2 of the first bush piece 61 or the corners C3 and C4 of the second bush piece 62.

After that, in a heating step, a region including a bush bonding portion (a part where the rubber bush 60 is bonded) of the stabilizer 20 is heated to a predetermined temperature (200° C. or lower). In this heating step, before the bush pieces 61 and 62 are placed over the stabilizer 20, the stabilizer 20 is heated by high-frequency induction heating, for example. The heated stabilizer 20 is kept at a curing temperature (for example, 110 to 170° C.) of the adhesion layer 70. In this temperature range, the inner surfaces 64 and 65 of the first bush piece 61 and the second bush piece 62 are brought to overlap the bush bonding portion of the stabilizer 20. Further, the bush pieces 61 and 62 are clamped from both sides and pressurized.

While the first bush piece 61 and the second bush piece 62 are being clamped on the bush bonding portion of the stabilizer 20, the adhesion layer 70 is heated by the heat of the stabilizer 20. The adhesion layer 70 is cured in a temperature range (for example, 110 to 170° C.) in which the adhesive 71 is cured. In the heated adhesion layer 70, the solvent is vaporized and curing takes place. In this way, the first bush piece 61 and the second bush piece 62 are bonded to the stabilizer 20. Note that when the heating temperature of the adhesion layer 70 is lower than the temperature of the above range, adhesion failure may occur. If the heating temperature of the adhesion layer 70 is higher than the temperature of the above range, the coating film 40 may be deteriorated, and the durability may be decreased. Further, if the heating temperature is higher than the temperature of the above range, a compressive residual stress imparted to the surface layer portion of the stabilizer 20 in advance by shot peening is sometimes not maintained.

When a rubber bush is bonded to a stabilizer by using a primer layer (an undercoat layer) and an adhesive (a top coat) in a conventional stabilizer manufacturing process, the primer layer is applied to a surface of the stabilizer first. After that, the adhesive is applied on the primer layer. Further, it is common to place the rubber bush on the adhesive. Accordingly, in a conventional bush-bonding-type stabilizer, the adhesive does not stick on an end face of the rubber bush.

In contrast, in the stabilizer manufacturing process of the present embodiment, before the rubber bush 60 is placed over the stabilizer 20, the adhesive 71 and the primer layer 72 are applied to the inner surfaces 64 and 65 of the bush pieces 61 and 62. Accordingly, the bonding display portion 80 comprising at least one of the adhesive 71 and the primer layer 72 can be formed at the corners C1 to C4 on the end faces 66 to 69 of the rubber bush 60.

In the stabilizer device 10 of the present embodiment, the bonding display portion 80 is provided in at least one place of the corners C1 to C4 around the hole 63 on the end face of the rubber bush 60. Accordingly, even after the rubber bush 60 has been mounted on the stabilizer 20, by visually checking the presence or absence of the bonding display portion 80, it is possible to determine whether the adhesion layer 70 exists between the stabilizer 20 and the rubber bush 60.

Therefore, in bush-bonding-type stabilizer devices, a defective product, which is a device not provided with the adhesion layer 70 between stabilizer 20 and the rubber bush 60, can be found by visual inspection. Meanwhile, in bush-unbonded-type stabilizer devices, a defective product, which is a device erroneously provided with an adhesion layer provided between the stabilizer and the rubber bush, can be found by checking the bonding display portion 80.

In the stabilizer device 10 of the present embodiment, before the bush pieces 61 and 62 are placed over the stabilizer 20, a part of the stabilizer 20 in a longitudinal direction thereof (i.e., the bush bonding portion) is heated by induction heating or the like. Accordingly, as compared to a case of heating the bush bonding portion indirectly from outside, in a state where the rubber bush is placed over the stabilizer, as has been performed conventionally, the heating time can be shortened, and controlling the temperature of the bush bonding portion is easier.

Figure 8:
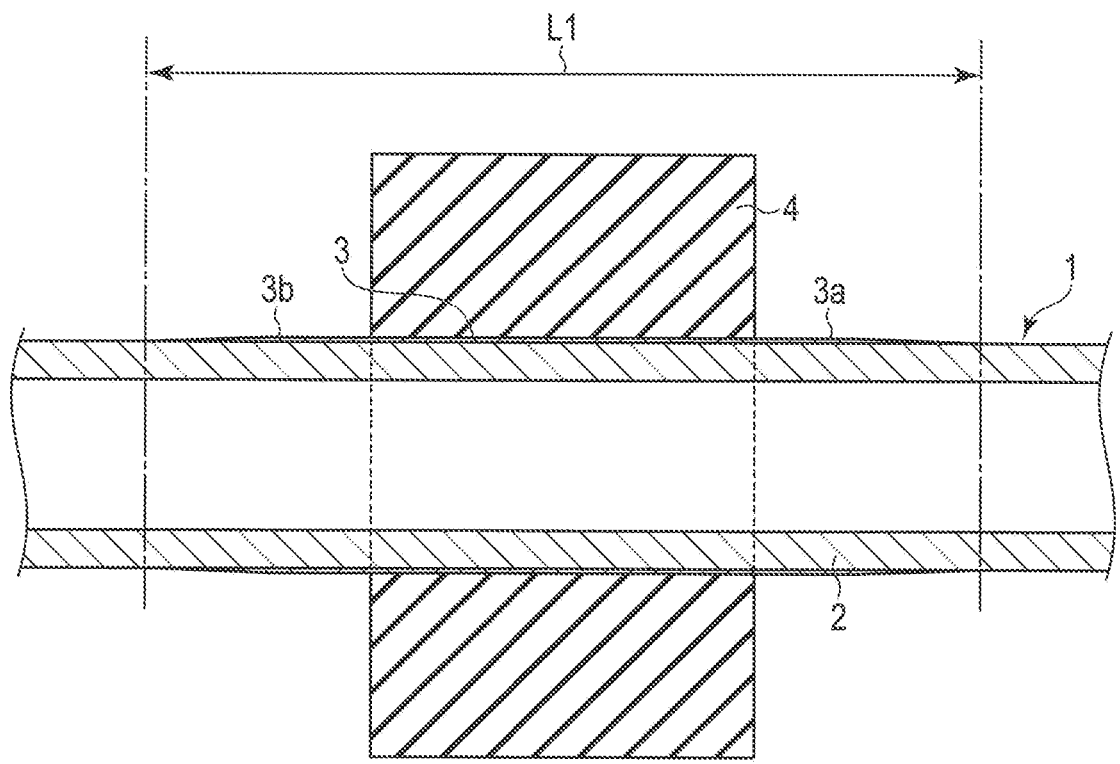
FIG. 8 is a cross-sectional view schematically showing a conventional stabilizer device.

Moreover, in the stabilizer device 10 of the present embodiment, the adhesive 71 and the primer layer 72 are applied to only the rubber bush 60. In other words, it is sufficient if a range of application of the adhesion member 73 is substantially a length L2 (FIG. 3) of the rubber bush 60. Accordingly, according to the stabilizer device 10 of the present embodiment, the amount of use of the adhesion member 73 can be greatly reduced, as compared to a conventional application range L1 shown in FIG. 8. Moreover, on the surface of the stabilizer 20, the adhesion member 73 does not stick to a portion other than the bush bonding portion. Accordingly, a problem that the outer appearance of the stabilizer 20 impaired by the adhesion member sticking on the surface of the stabilizer 20 does not arise.

The bonding display portion 80 formed at the corners C1 to C4 of the bush pieces 61 and 62 may be formed around at least a part of the hole 63 in the circumferential direction thereof. Alternatively, the bonding display portion 80 may be formed on the entire periphery of the hole 63. When the bonding display portion 80 is formed on the entire periphery of the hole 63, the bonding display portion 80 is able to block (suppress) oil or moisture, etc., making its way into the rubber bush 60 along the surface of the stabilizer 20.

FIG. 7 shows a rubber bush 60' according to a second embodiment. In the rubber bush 60' of this embodiment, a first bush piece 61 and a second bush piece 62 are connected to each other via a hinge portion 90. In this case, one of the bush pieces of the first bush piece 61 and the second bush piece 62 is folded over the other bush piece along the hinge portion 90 to sandwich the stabilizer between inner surfaces 64 and 65. Since the other structures of the rubber bush 60' of this embodiment are similar to those of the rubber bush 60 of the first embodiment, common reference numerals are added to parts that are in common, and explanations of those parts will be omitted.

Needless to say, the specific forms, arrangement, and the like, of the stabilizer, and the bracket and rubber bush, etc., of the bush unit can be modified variously according to the specifications of the suspension mechanism part, in implementing the present invention. A steel material, which is the material of the stabilizer, may be a solid material other than a hollow material (a steel pipe). Further, a core made of an iron plate or synthetic resin for adjusting the stiffness, etc., may be inserted into the rubber bush, and the number of dividing the rubber bush (the number of bush pieces) may be greater than two (for example, three).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle stabilizer device including:
   a stabilizer extending in a width direction of a vehicle, a coating film formed of resin covering an outer surface of the stabilizer; and
   a bush unit provided on a support portion of the stabilizer, the bush unit comprising:
      a bracket formed of metal;
      a rubber bush comprising an upper first bush piece and a lower second bush piece arranged inside the bracket, the rubber bush including a hole through which the stabilizer passes;
      an adhesion layer provided between an inner surface of the hole of the rubber bush and the stabilizer, the adhesion layer being formed of an adhesion member formed on the inner surface;
      a first bonding display portion formed of a part of the adhesion member, the first bonding display portion being provided at a first corner on a first end face of the second bush piece near the inner surface, and sticking to the second bush piece and the coating film along the first end face of the second bush piece; and
      a second bonding display portion formed of a part of the adhesion member, the second bonding display portion being provided at a second corner on a second end face of the second bush piece near the inner surface, and sticking to the second bush piece and the coating film along the second end face of the second bush piece,
   wherein:
   the bracket comprises a cover portion which covers the second bush piece,
   the cover portion comprises a first end portion formed along the first end face of the second bush piece and a second end portion formed along the second end face of the second bush piece,
   the first bonding display portion is disposed between an outer surface of the first end portion of the cover portion and the first end face of the second bush piece along an axial direction of the bush unit, and
   the second bonding display portion is disposed between an outer surface of the second end portion of the cover portion and the second end face of the second bush piece along the axial direction of the bush unit.

2. The vehicle stabilizer device of claim 1, wherein the adhesion member includes an adhesive formed on the inner surface, and wherein the first and second bonding display portions comprise the adhesive.

3. The vehicle stabilizer device of claim 2, wherein the first bonding display portion is formed at a part of the hole in a circumferential direction thereof at the first corner, and the second bonding display portion is formed at a part of the hole in a circumferential direction thereof at the second corner.

4. The vehicle stabilizer device of claim 2, wherein the first bonding display portion is formed on an entire periphery of the hole at the first corner, and the second bonding display portion is formed on an entire periphery of the hole at the second corner.

5. The vehicle stabilizer device of claim 1, wherein the adhesion member includes an adhesive formed on the inner surface and a primer layer formed on the adhesive, and wherein the first and second bonding display portions comprise the primer layer.

6. The vehicle stabilizer device of claim 5, wherein the first bonding display portion is formed at a part of the hole in a circumferential direction thereof at the first corner, and the second bonding display portion is formed at a part of the hole in a circumferential direction thereof at the second corner.

7. The vehicle stabilizer device of claim 5, wherein the first bonding display portion is formed on an entire periphery of the hole at the first corner, and the second bonding display portion is formed on an entire periphery of the hole at the second corner.

8. The vehicle stabilizer device of claim 1, wherein the adhesion member includes an adhesive formed on the inner surface and a primer layer formed on the adhesive, and wherein the first and second bonding display portions comprise the adhesive and the primer layer.

9. The vehicle stabilizer device of claim 8, wherein the first bonding display portion is formed at a part of the hole in a circumferential direction thereof at the first corner, and the second bonding display portion is formed at a part of the hole in a circumferential direction thereof at the second corner.

10. The vehicle stabilizer device of claim 8, wherein the first bonding display portion is formed on an entire periphery of the hole at the first corner, and the second bonding display portion is formed on an entire periphery of the hole at the second corner.

11. The vehicle stabilizer device of claim 1, wherein the first bonding display portion is formed at a part of the hole in a circumferential direction thereof at the first corner, and the second bonding display portion is formed at a part of the hole in a circumferential direction thereof at the second corner.

12. The vehicle stabilizer device of claim 1, wherein the first bonding display portion is formed on an entire periphery of the hole at the first corner, and the second bonding display portion is formed on an entire periphery of the hole at the second corner.

13. The vehicle stabilizer device of claim 1, wherein:
the first bonding display portion is disposed between the stabilizer and the first end portion of the cover portion in a circumferential direction of the stabilizer, and
the second bonding display portion is disposed between the stabilizer and the second end portion of the cover portion in a circumferential direction of the stabilizer.

* * * * *